(12) United States Patent
Agnew et al.

(10) Patent No.: US 8,709,673 B2
(45) Date of Patent: Apr. 29, 2014

(54) FUEL CELL AND A METHOD OF MANUFACTURING A FUEL CELL

(75) Inventors: Gerard D Agnew, Derby (GB); Peter J Dixon, Derby (GB)

(73) Assignee: LG Fuel Cell Systems Inc, North Canton, OH (US)

( * ) Notice: Subject to any disclaimer, the term of this patent is extended or adjusted under 35 U.S.C. 154(b) by 625 days.

(21) Appl. No.: 12/669,888

(22) PCT Filed: Jul. 10, 2008

(86) PCT No.: PCT/GB2008/002367
§ 371 (c)(1),
(2), (4) Date: May 28, 2010

(87) PCT Pub. No.: WO2009/019421
PCT Pub. Date: Feb. 12, 2009

(65) Prior Publication Data
US 2010/0255400 A1   Oct. 7, 2010

(30) Foreign Application Priority Data
Aug. 3, 2007   (GB) .................................. 0715218.4

(51) Int. Cl.
*H01M 8/12*   (2006.01)
*H01M 8/24*   (2006.01)
*H01M 8/04*   (2006.01)

(52) U.S. Cl.
USPC ............ 429/457; 429/495; 429/498; 429/535

(58) Field of Classification Search
None
See application file for complete search history.

(56) References Cited

U.S. PATENT DOCUMENTS 4,187,755 A * 2/1980 Shirai ............................ 83/882
5,486,428 A   1/1996 Gardner et al.
(Continued)

FOREIGN PATENT DOCUMENTS

DE   20 2006 002 731 U1   9/2006
EP   0 668 622 A1   8/1995
(Continued)

OTHER PUBLICATIONS

International Search Report issued in corresponding International Application No. PCT/GB2008/002367, mailed Nov. 13, 2008.

(Continued)

*Primary Examiner* — John S Maples
(74) *Attorney, Agent, or Firm* — Oliff PLC

(57) ABSTRACT

A solid oxide fuel cell comprises a porous anode electrode, a dense non-porous electrolyte and a porous cathode electrode. The anode electrode comprises a plurality of parallel plate members and the cathode electrode comprises a plurality of parallel plate members. The plate members of the cathode electrode inter-digitate with the plate members of the anode electrode. The electrolyte comprises at least one electrolyte member, which fills at least one space between the parallel plate members of the anode electrode and the parallel plate members of the cathode electrode. At least one non-ionically conducting member fills at least one space between the parallel plate members of the anode electrode and the parallel plate members of the cathode electrode and the at least one electrolyte member and the at least one non-ionically conducting member are arranged alternately.

17 Claims, 6 Drawing Sheets

(56) References Cited

U.S. PATENT DOCUMENTS

| | | | |
|---|---|---|---|
| 5,549,983 A | | 8/1996 | Yamanis |
| 6,361,892 B1 | * | 3/2002 | Ruhl et al. ............... 429/443 |
| 6,890,677 B2 | * | 5/2005 | Klitsner et al. ............ 429/434 |
| 7,858,261 B2 | * | 12/2010 | Schaevitz et al. .......... 429/508 |
| 2002/0058175 A1 | | 5/2002 | Ruhl |
| 2003/0012997 A1 | * | 1/2003 | Hsu ............................ 429/20 |
| 2003/0170520 A1 | | 9/2003 | Fujii et al. |
| 2003/0235727 A1 | | 12/2003 | Noetzel et al. |
| 2004/0043278 A1 | | 3/2004 | Bourgeois et al. |
| 2004/0081875 A1 | * | 4/2004 | Milliken et al. ............. 429/30 |
| 2004/0121217 A1 | | 6/2004 | Herman et al. |
| 2005/0064266 A1 | * | 3/2005 | Abdou et al. ............... 429/35 |
| 2005/0074659 A1 | * | 4/2005 | Thomas et al. ............. 429/38 |
| 2005/0155490 A1 | * | 7/2005 | Barker et al. ............... 96/15 |
| 2005/0227134 A1 | | 10/2005 | Nguyen |
| 2005/0249996 A1 | * | 11/2005 | Meacham .................... 429/35 |
| 2005/0260461 A1 | | 11/2005 | Wood et al. |
| 2006/0115709 A1 | * | 6/2006 | Badding et al. ............. 429/39 |
| 2006/0234100 A1 | * | 10/2006 | Day et al. ................... 429/33 |

FOREIGN PATENT DOCUMENTS

| | | |
|---|---|---|
| EP | 1 521 322 A2 | 4/2005 |
| EP | 1 703 580 A1 | 9/2006 |
| GB | 2 323 700 A | 9/1998 |
| WO | WO 2005/008816 A3 | 1/2005 |
| WO | WO 2006/019419 A2 | 2/2006 |
| WO | WO 2006/027421 A2 | 3/2006 |
| WO | WO 2006/053422 A1 | 5/2006 |
| WO | WO 2007/055301 A1 | 5/2007 |

OTHER PUBLICATIONS

Written Opinion of the International Searching Authority issued in corresponding International Application No. PCT/GB2008/002367, mailed Nov. 13, 2008.

GB Search Report issued in corresponding British Application No. GB0715218.4, conducted Sep. 25, 2007.

Dec. 4, 2013 Taiwanese Office Action issued in Taiwanese Patent Application No. 097128087.

* cited by examiner

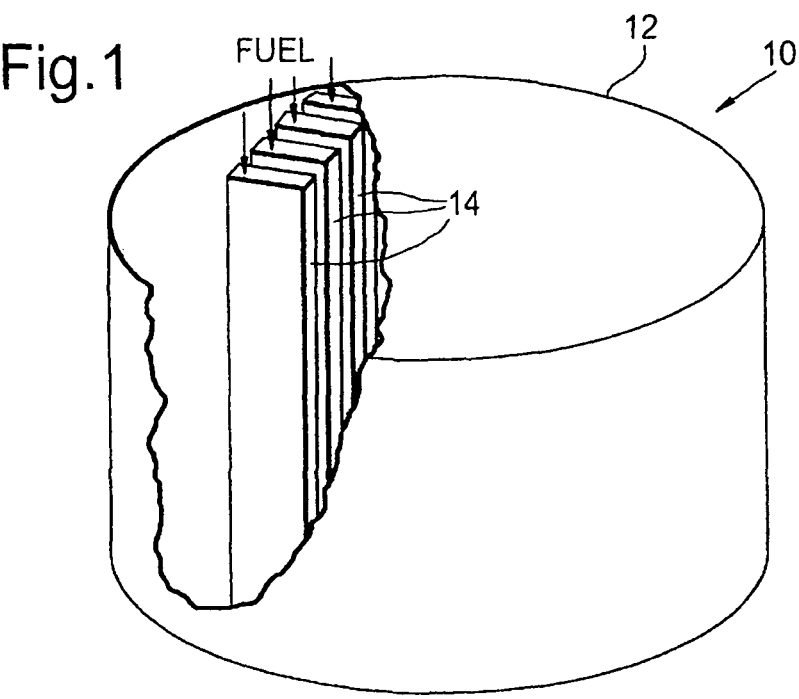
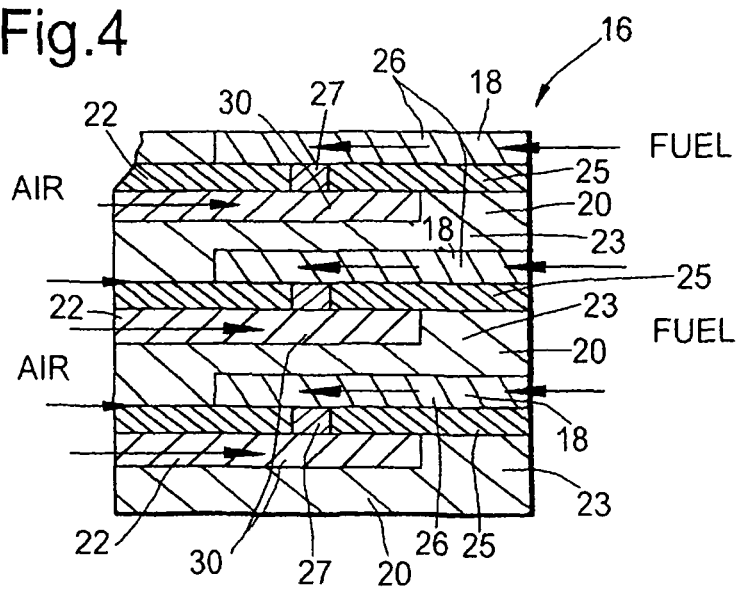

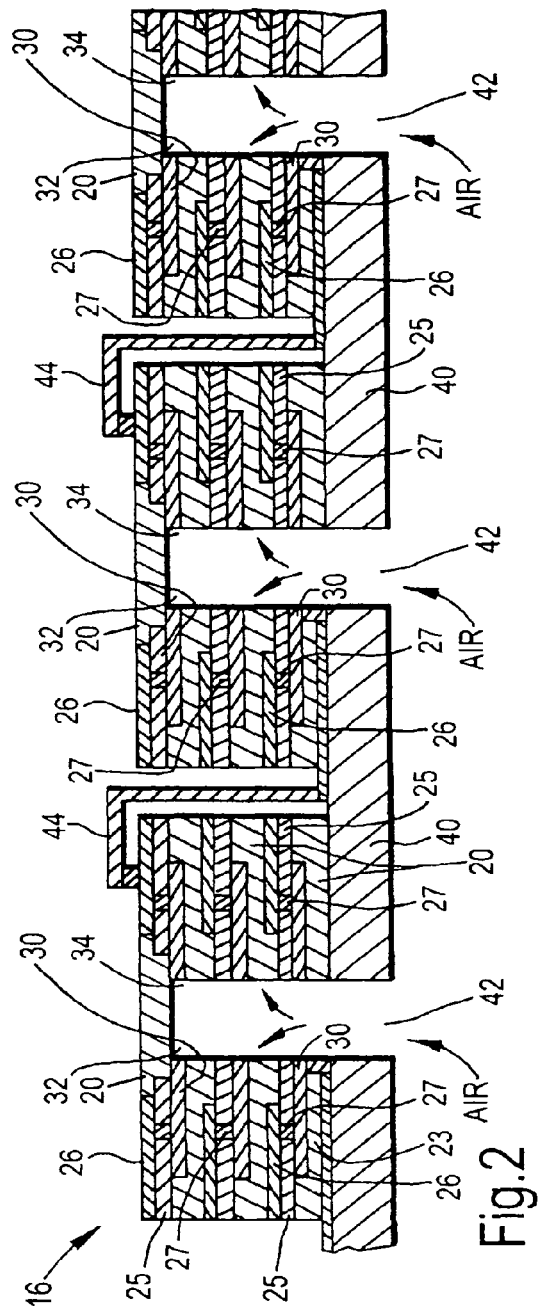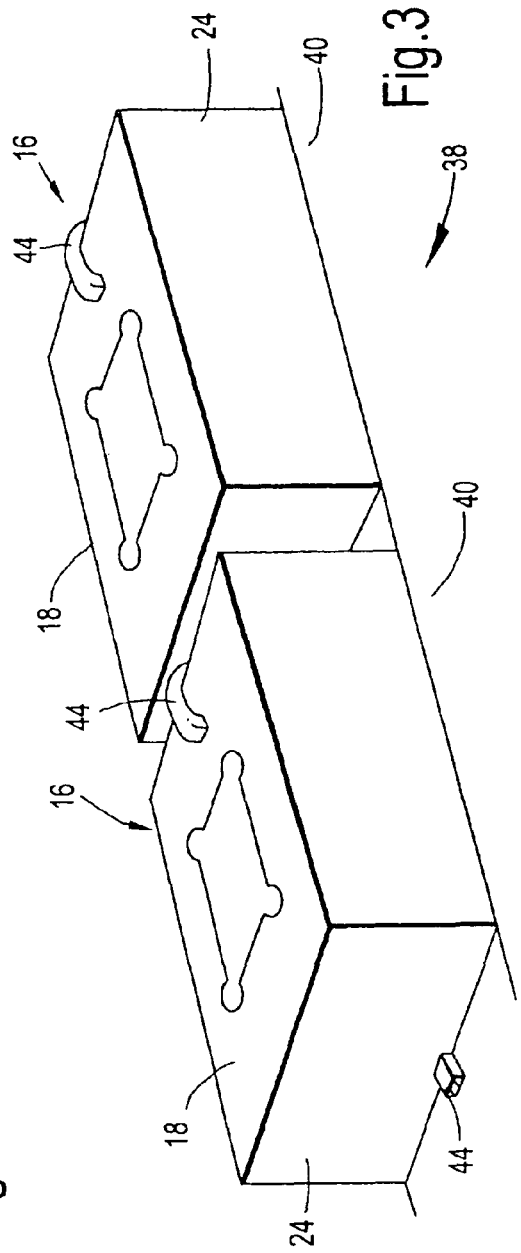

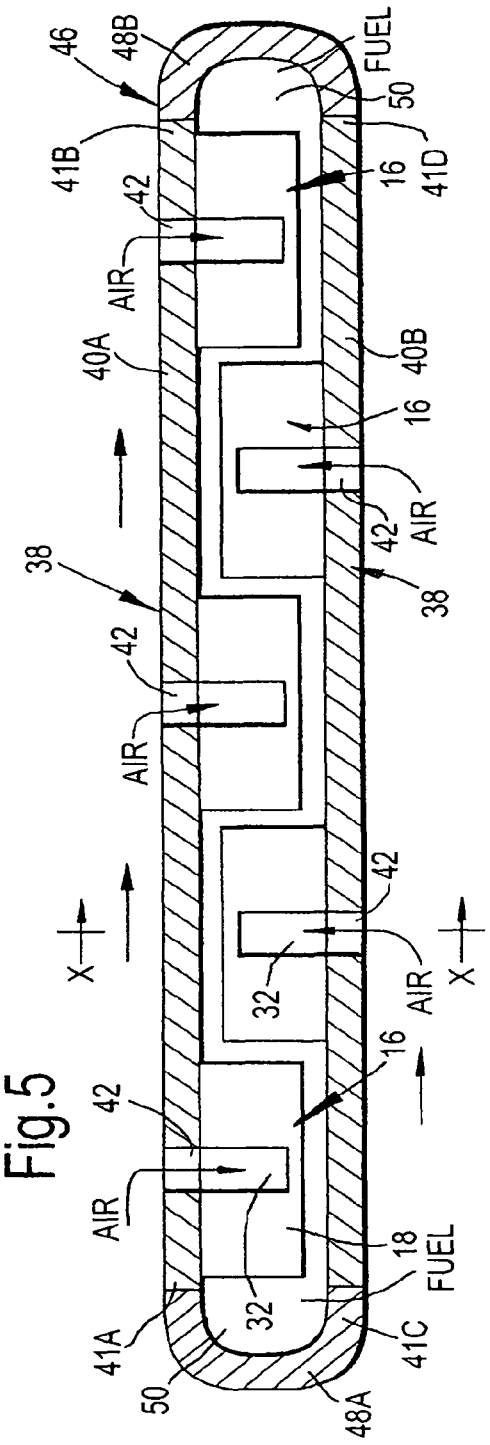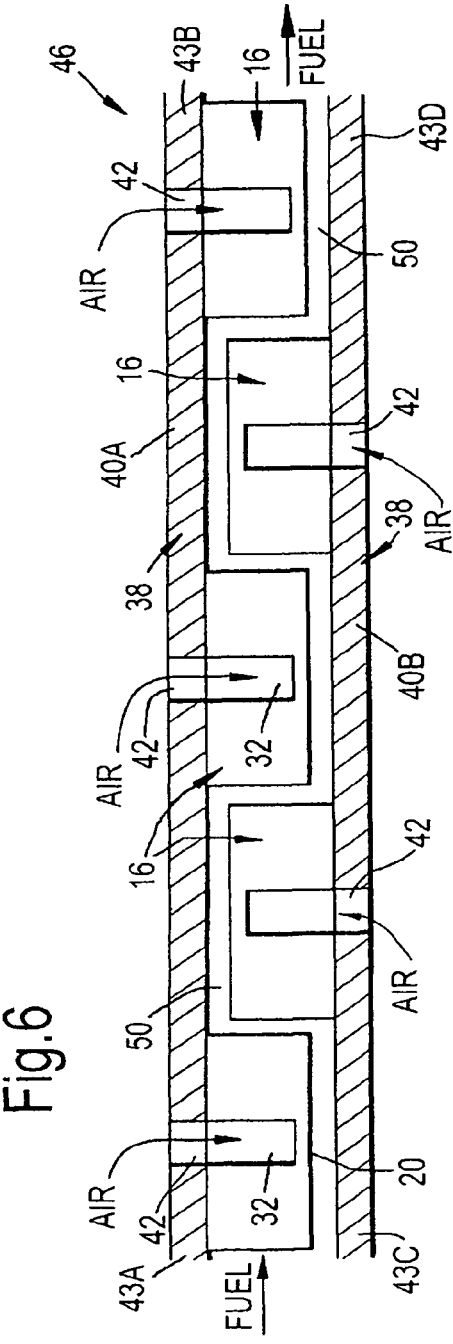

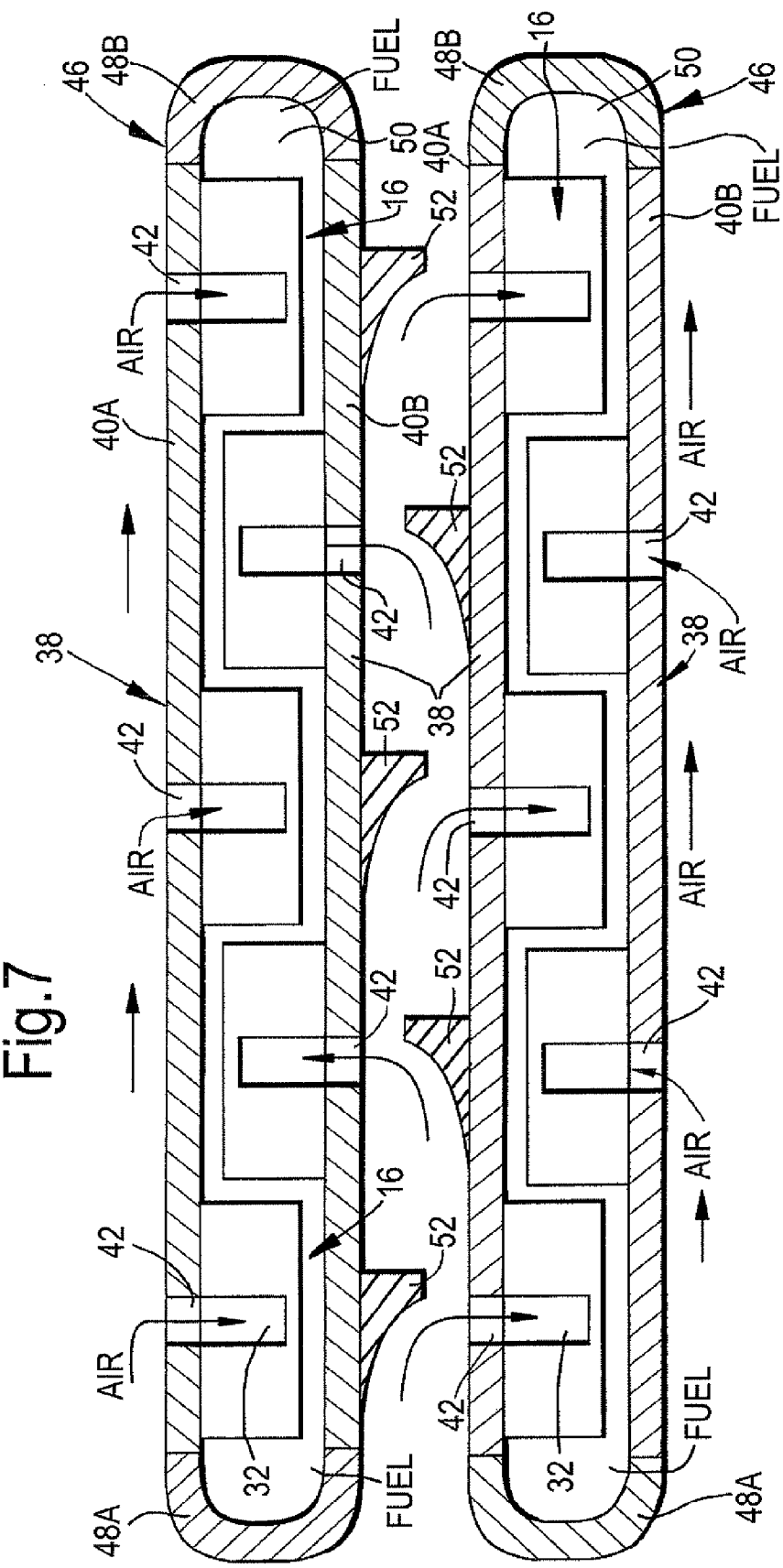

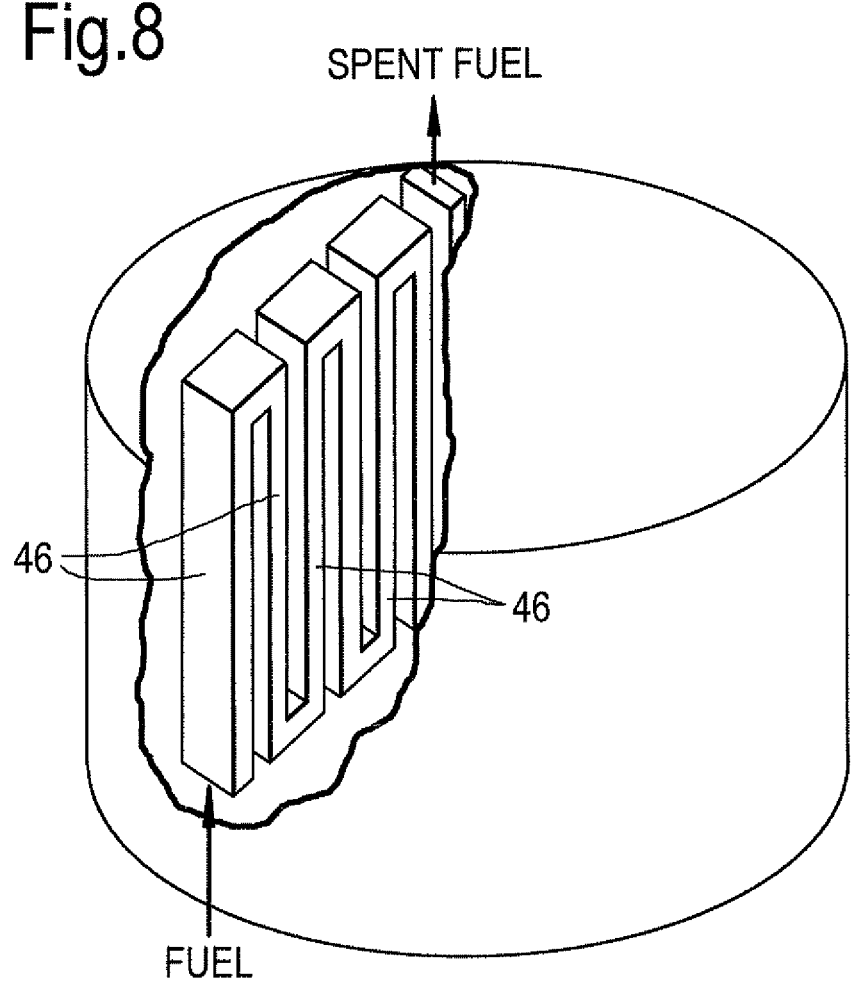

FUEL CELL AND A METHOD OF MANUFACTURING A FUEL CELL

The present invention relates to a fuel cell, more particularly to a ceramic fuel cell and in particular to a solid oxide fuel cell and also relates to a method of manufacturing a fuel cell, more particularly to a method of manufacturing a ceramic fuel cell and in particular to a method of manufacturing a solid oxide fuel cell.

One type of solid oxide fuel cell is the tubular solid oxide fuel cell in which solid oxide fuel cells are arranged electrically, and physically, in series axially along the cylindrical surface of a hollow tubular member.

A further type of solid oxide fuel cell is the planar solid oxide fuel cell in which solid oxide fuel cells are arranged electrically, and physically, in series longitudinally along the flat surfaces of a hollow flat member.

Another type of solid oxide fuel cell is the monolithic solid oxide fuel cell in which anode plates electrolyte plates, cathode plates and interconnector plates are stacked sequentially.

Accordingly the present invention seeks to provide a novel fuel cell.

Accordingly the present invention provides a fuel cell comprising a porous anode electrode, a dense non-porous electrolyte and a porous cathode electrode, the anode electrode comprising a plurality of parallel plate members, the cathode electrode comprising a plurality of parallel plate members, the plate members of the cathode electrode inter-digitating with the plate members of the anode electrode, the electrolyte comprising at least one electrolyte member filling at least one space between the parallel plate members of the anode electrode and the parallel plate members of the cathode electrode, at least one non-ionically conducting member filling at least one space between the parallel plate members of the anode electrode and the parallel plate members of the cathode electrode, the at least one electrolyte member and the at least one non-conically conducting member being arranged alternately and the at least one non-ionically conducting member having at least one interconnector to electrically interconnect at least one parallel plate member of the anode electrode and at least one parallel plate member of the cathode electrode.

Preferably the fuel cell is a ceramic fuel cell, more preferably the fuel cell is a solid oxide fuel cell. Preferably the electrolyte comprises zirconia. Preferably the electrolyte comprises yttria stabilised zirconia.

Preferably the parallel plate members of the anode electrode, the parallel plate members of the cathode electrode, the electrolyte members and the non-ionically conducting members are provided with aligned apertures, which define a conduit for a flow of fuel.

Preferably a first end of the conduit is sealed by an end cap or electrolyte.

Alternatively the parallel plate members of the anode electrode, the parallel plate members of the cathode electrode, the electrolyte members and the non-ionically conducting members are provided with aligned apertures, which define a conduit for a flow of an oxidant.

Alternatively a first end of the conduit is sealed by an end cap or an electrolyte.

Preferably the plate members of the anode electrode are substantially circular, rectangular, square or hexagonal in shape. Preferably the plate members of the cathode electrode are substantially circular, rectangular, square or hexagonal in shape.

Preferably the fuel cell is arranged on a dense non-porous member and the dense non-porous member has an aperture to supply fuel to the first member.

Preferably the fuel cell is arranged on a dense non-porous member and the dense non-porous member has an aperture to supply oxidant to the second member.

Preferably the fuel cell is arranged on a dense non-porous tube and the dense non-porous tube has an aperture to supply fuel to the first member.

Preferably the fuel cell is arranged on a dense non-porous tube and the dense non-porous tube has an aperture to supply oxidant to the second member.

Preferably the fuel cell is arranged on a dense non-porous plate and the dense non-porous plate has an aperture to supply fuel to the first member.

Preferably the fuel cell is arranged on a dense non-porous plate and the dense non-porous plate has an aperture to supply oxidant to the second member.

The present invention also provides a fuel cell stack comprising a plurality of the fuel cells, mentioned in the preceding paragraphs, electrically connected in series.

Preferably the fuel cell stack comprises a first dense non-porous plate and a second dense non-porous plate, the first dense non-porous plate has a plurality of apertures to supply oxidant to a conduit of a respective one of a plurality of fuel cells, the conduit is arranged to supply oxidant to the parallel plate members of the cathode electrode of the respective one of the plurality of fuel cells, the second dense non-porous plate has a plurality of apertures to supply oxidant to a conduit of a respective one of a plurality of fuel cells, the conduit is arranged to supply oxidant to the parallel plate members of the cathode electrode of the respective one of the plurality of fuel cells, the first and second dense non-porous plates are arranged with the fuel cells therebetween to form a passage for supply of a fuel to the parallel plate members of the anode electrodes of the fuel cells.

Preferably the fuel cells on the first and second dense non-porous plates are arranged in predetermined patterns. Preferably the fuel cells on the first dense non-porous plate are arranged alternately with fuel cells on the second dense non-porous plate.

The present invention also provides a method of manufacturing a fuel cell comprising forming a plurality of sheets of electrolyte material, depositing anode electrode material on a first surface of each sheet of electrolyte material, depositing cathode material on a second surface of each sheet of electrolyte material, forming a plurality of apertures through each sheet of electrolyte material, forming a plurality of sheets of non-ionically conducting material, forming a plurality of apertures through each sheet of non-ionically conducting material, arranging the sheets of electrolyte material in a stack such that that the anode electrode material of one sheet of electrolyte material faces the cathode electrode material of an adjacent sheet of electrolyte material and arranging the sheets of non-ionically conducting material in the stack such that each sheet of non-ionically conducting material is positioned between two adjacent sheets of electrolyte material and such that the apertures in the sheets of non-ionically conducting material are aligned with the apertures in the sheets of electrolyte material, dividing the stack into a plurality of pieces such that an aperture extends into each piece to form a fuel cell.

Preferably the method comprises forming a plurality of apertures through each sheet of electrolyte material before depositing anode electrode material on a first surface of each sheet of electrolyte material and depositing cathode material on a second surface of each sheet of electrolyte material.

Alternatively the method comprises depositing anode electrode material on a first surface of each sheet of electrolyte material and depositing cathode material on a second surface of each sheet of electrolyte material before forming a plurality of apertures through each sheet of electrolyte material.

The present invention also provides a method of manufacturing a fuel cell comprising forming at least one sheet of electrolyte material, depositing anode electrode material on a first surface of each sheet of electrolyte material and depositing cathode material on a second surface of each sheet of electrolyte material, forming a plurality of apertures through each sheet of electrolyte material, dividing the at least one sheet of electrolyte material into a plurality of pieces such that an aperture extends through each piece, forming at least one sheet of non-ionically conducting material, forming a plurality of apertures through each sheet of non-conically conducting material, dividing the at least one sheet of non-conically conducting material into a plurality of pieces such that an aperture extends through each piece, arranging the pieces of electrolyte material in a stack such that that the anode electrode material of one piece of electrolyte material faces the cathode electrode material of an adjacent piece of electrolyte material and the apertures in the pieces of electrolyte material are aligned, arranging the pieces of non-ionically conducting material in the stack such that each piece of non-ionically conducting material is positioned between two adjacent pieces of electrolyte material and such that the apertures in the sheets of non-ionically conducting material are aligned with the apertures in the sheets of electrolyte material to form a fuel cell.

The present invention will be more fully described by way of example with reference to the accompanying drawings in which:—

FIG. 1 is a partially cut-away perspective view of a fuel cell stack having a plurality of fuel cells according to the present invention.

FIG. 2 is an enlarged cross-sectional view though a portion of a fuel cell assembly having a plurality of fuel cells according to the present invention.

FIG. 3 shows is a perspective view of a portion of the fuel cell assembly having a plurality of fuel cells according to the present invention.

FIG. 4 is a further enlarged cross-sectional view through a portion of a fuel cell shown in FIG. 2.

FIG. 5 is a cross-sectional view of a portion of a fuel cell module having comprising two fuel cell assemblies having a plurality of fuel cells according to the present invention.

FIG. 6 is cross-sectional view in the direction X-X through the fuel cell module shown in FIG. 5.

FIG. 7 is a cross-sectional view of a portion of two adjacent fuel cell modules comprising two fuel cell assemblies having a plurality of fuel cells according to the present invention.

FIG. 8 is a partially cut-away perspective view of a further fuel cell stack having a plurality of fuel cells according to the present invention.

Figure 9:
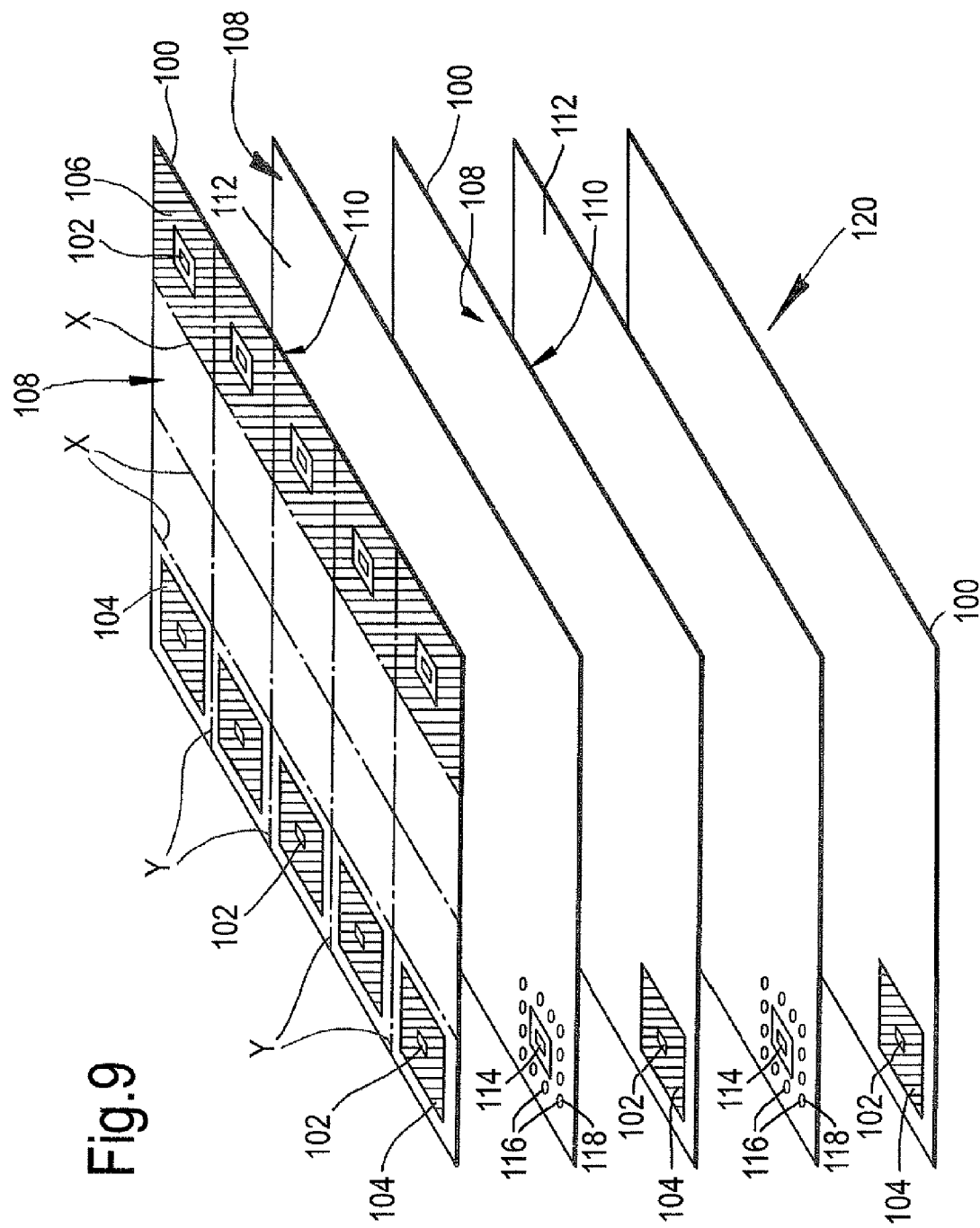
FIG. 9 is an exploded perspective view of a stack of sheets of electrolyte material during the manufacture of fuel cells according to the present invention.

A solid oxide fuel cell stack 10, as shown in FIG. 1, comprises a plurality of solid oxide fuel cell modules 14 arranged within a casing 12. Each solid oxide fuel cell module 14 comprises a plurality of solid oxide fuel cells 16.

Each solid oxide fuel cell 16, as shown more clearly in FIGS. 2, 3 and 4 comprises a porous anode electrode 18, a dense non-porous electrolyte 20 and a porous cathode electrode 22. The anode electrode 18 comprises a plurality of parallel plate members 26. Similarly the cathode electrode 22 comprises a plurality of parallel plate members 30. The plate members 30 of the cathode electrode 22 inter-digitate with the plate members 26 of the anode electrode 18. The dense non-porous electrolyte 20 comprises at least one, preferably a plurality of electrolyte members 23, which fills at least one space between the parallel plate members 26 of the anode electrode 18 and the parallel plate members 30 of the cathode electrode 22. At least one, preferably a plurality of, non-ionically conducting member 25 fills at least one space between the parallel plate members 26 of the anode electrode 18 and the parallel plate members 30 of the cathode electrode 22. The at least one electrolyte member 23 and the at least one non-ionically conducting member 25 are arranged alternately in the spaces between the plate members 26 of the anode electrode 18 and the plate members 30 of the cathode electrode 22. The at least one non-ionically conducting member 25 has an interconnector 27 to electrically interconnect at least one parallel plate member 26 of the anode electrode 18 and at least one parallel plate member 30 of the cathode electrode 22. The parallel plates 26 and the parallel plates 30 are gas permeable/gas porous.

In the arrangement shown in FIGS. 2 and 3 the edges of the parallel plate members 30 of the cathode electrode together with the edges of the electrolyte members 23 and the edges of the non-ionically conducting members 25 form a conduit 32 for the flow of an oxidant, e.g. oxygen or air. A first end 34 of the conduit 32 is sealed by the electrolyte 20, in this case the electrolyte 20 is arranged to extend across the first end 34 of the conduit 32. Alternatively an end cap may be provided to close and seal the first end 34 of the conduit 32. The second end 36 of the conduit 32 is open to allow a flow of oxidant, oxygen or air, into the conduit 32.

The parallel plate members 26 of the anode electrode 18, the parallel plate members 30 of the cathode electrode 22, the electrolyte members 23 and the non-ionically conducting members 25 are provided with aligned apertures, which define the conduit 32 for the flow of the oxidant. The conduit in the fuel cell is supplied with oxidant and fuel is supplied around the fuel cell.

The plate members 26 are substantially rectangular in shape, the plate members 30 are rectangular in shape, the electrolyte members 23 are rectangular in shape and the non-ionically conducting members 25 are rectangular in shape.

Alternatively the plate members 26, the plate members 30, the electrolyte members 23 and the non-ionically conducting members 25 may be square, circular, hexagonal, triangular, square or other suitable shape.

A plurality of the solid oxide fuel cells 16 are arranged in a solid oxide fuel cell assembly 38 and in particular the solid oxide fuel cells 16 are arranged on a dense non-porous member 40 and the dense non-porous member 40 has a plurality of apertures 42 and each aperture 42 is aligned with a conduit 32 of a corresponding one of the solid oxide fuel cells 16 and is arranged to supply oxidant to the conduit 32 within a corresponding one of the solid oxide fuel cells 16. Each solid oxide fuel cell 16 is bonded and sealed to the dense non-porous member 40 in a gas tight fashion to prevent oxidant leaking to the fuel and visa-versa.

One or more electrical interconnectors 44 are provided to interconnect the uppermost parallel plate member 26 of the anode electrode 18 of one solid oxide fuel cell 16 with the lowermost parallel plate member 30 of the cathode electrode 22 of an adjacent solid oxide fuel cell 16, as shown in FIGS. 2 and 3.

Generally two of these solid oxide fuel cell assemblies 38 are provided to form a solid oxide fuel cell module 46, as shown in FIGS. 5 and 6. The solid oxide fuel cell module 46 comprises a first dense non-porous plate 40A and a second dense non-porous plate 40B. The first dense non-porous plate 40A has a plurality of apertures 42 to supply oxidant to the conduits 32 of respective ones of a plurality of solid oxide fuel cells 16. The second dense non-porous plate 40B has a plurality of apertures 42 to supply oxidant to the conduits 32 of respective ones of a plurality of solid oxide fuel cells 16. The first and second dense non-porous plates 40A and 40B are arranged substantially parallel with the solid oxide fuel cells 16 positioned therebetween to form a passage 50 for the supply of a fuel to the anode electrodes 18 of the solid oxide fuel cells 16. There are provided two edge members 48A, 48B. Edge member 48A is bonded and sealed to the first edges 41A and 41O of the first dense non-porous plate 40A and the second dense non-porous plate 40B respectively. Similarly edge member 48B is bonded and sealed to the second edges 41B and 41D of the first dense non-porous plate 40A and the second dense non-porous plate 40B respectively. The gap between the first ends 43A and 43O of the first dense non-porous plate 40A and the second dense non-porous plate 40B respectively is open to allow the supply of fuel into the passage 50 and the gap between the second ends 43B and 43D of the first dense non-porous plate 40A and the second dense non-porous plate 40B is open to allow the removal of fuel from the passage 50. Thus, the first and second dense non-porous plates 40A and 40B and the edge members 48A and 48B form a tube.

The solid oxide fuel cells 16 on the first and second dense non-porous plates 40A and 40B are arranged in predetermined patterns, and in this example the solid oxide fuel cells 16 on the first dense non-porous plate 40A are arranged alternately with the solid oxide fuel cells 16 on the second dense non-porous plate 40B in a direction between the edges of the plates 41A and 41B and also in a direction between the ends of the plates 43A and 43B. A square pattern has been described, but other patterns may be used, such as hexagonal or octagonal patterns.

In operation fuel, hydrogen, is supplied to the passage 50 within the solid oxide fuel cell modules 46 and the fuel, hydrogen, contacts the anode electrodes 18 and oxidant, oxygen or air, is supplied over the outer surfaces of the solid oxide fuel cell modules 46 and the oxidant, oxygen or air, flows through the apertures 42 in the first and second non-porous plates 40A and 40B into the conduits 32 and contacts the cathode electrodes 22.

The fuel initially diffuses into the edges of the parallel plate members 26 of the anode electrodes 18 of the solid oxide fuel cells 16 and then diffuses from the edges of the parallel plate members 26 further into the parallel plate members 26 of the anode electrodes 18 of the solid oxide fuel cells 16. Similarly the oxidant initially diffuses into the edges of the parallel plate members 30 of the cathode electrodes 22 of the solid oxide fuel cells 16 and then diffuses from the edges of the parallel plate members 30 further into the parallel plate members 30 of the cathode electrodes 22 of the solid oxide fuel cells 16. The electrolyte 20 in each solid oxide fuel cell 16 closes the respective conduit 32 and prevents the mixing of the fuel and the oxidant.

The parallel plates 26 of each anode electrode 18 and the parallel plates 30 of each cathode electrode 22 are connected electrically in series to form a number of solid oxide fuel cells 16. The dense non-porous electrolyte 20 comprises a plurality of electrolyte members 23, which fill the spaces between the parallel plate members 26 of the anode electrode 18 and the parallel plate members 30 of the cathode electrode 22. A plurality of non-conically conducting members 25 fill the spaces between the parallel plate members 26 of the anode electrode 18 and the parallel plate members 30 of the cathode electrode 22. The electrolyte members 23 and the non-conically conducting members 25 are arranged alternately and the non-conically conducting members 25 have interconnectors 27 to electrically interconnect the parallel plate members 26 of the anode electrode 18 and the parallel plate members 30 of the cathode electrode 22. The electrolyte members 23 and the non-ionically conducting members 25 are positioned between and contact all the surfaces of the parallel plates 26 of the anode electrode 18 and contact all the surfaces of the parallel plates 30 of the cathode electrode 22 such that there are no spaces between the electrolyte members 23 and/or the non-ionically conducting members 25 and the parallel plates 26 and there are no spaces between the electrolyte members 23 and/or the non-ionically conducting members 25 and the parallel plates 30. Thus, fuel only flows by diffusion in the porous parallel plates 26 and oxidant only flows by diffusion in the porous parallel plates 30.

Heat is transferred from the solid oxide fuel cells 16 by heat conduction through the parallel plate members 26 and 30 and then heat is transferred partly conductively and partly convectively from the edges of the parallel plate members 26 to the fuel and from the edges of the parallel plate members 30 to the oxidant.

In this arrangement the oxidant flows into the apertures 42 by virtue of a flow bubble.

FIG. 7 shows two solid oxide fuel cell modules 46 arranged substantially parallel to each other in a solid oxide fuel cell stack. In this arrangement the plates 40A and 40B of the solid oxide fuel cell modules 46 are provided with a plurality of upstanding members 52. Each upstanding members 52 on plate 40A of one solid oxide fuel cell module 46 is positioned in alignment with a respective one of the apertures 42 in the plate 40B of an adjacent solid oxide fuel cell module 46 to direct oxidant, oxygen or air, into the apertures 42 and similarly each upstanding member 52 on the plate 40B of one solid oxide fuel cell modules 46 is positioned in alignment with a respective one of the apertures 42 in the plate 40A of an adjacent solid oxide fuel cell module 46 to direct oxidant, oxygen or air, into the apertures 42.

The solid oxide fuel cell modules 46 may be arranged such that one end of each solid oxide fuel cell module 46 is connected to a fuel supply manifold and the other end of each solid oxide fuel cell module 46 is connected to a spent fuel manifold as shown in FIG. 1.

The solid oxide fuel cell modules 46 may be arranged such that a first end of one of the solid oxide fuel cell modules 46 is connected to a fuel supply manifold and the second end of one of the solid oxide fuel cell modules 46 is connected to a spent fuel manifold and the remainder of the solid oxide fuel cell modules 46 are arranged such that the first end of the solid oxide fuel cell module 46 is connected to the second end of an adjacent solid oxide fuel cell module 46 such that the fuel supplies sequentially through all the solid oxide fuel cell modules 46 as shown in FIG. 8.

The electrolyte 20 comprises zirconia, preferably yttria stabilised zirconia, but other suitable materials may be used.

The anode electrode 18 comprises for example nickel doped yttria stabilised zirconia (Ni—YSZ), but other suitable materials may be used.

The cathode electrode 22 comprises for example strontium doped lanthanum manganite (LSM), but other suitable materials may be used.

The non-ionically conducting members 25 comprise non-ionically conducting zirconia. The non-conically conducting members 25 may comprises a thin gas-impermeable layer of metal, which also acts as the interconnector, however this may be difficult to seal.

As an example a single solid oxide fuel cell according to the present invention has a length of 6 mm, a width of 3 mm and a thickness of 2 mm.

The first member forms a conduit for the flow of a fuel. Preferably a first end of the first member is sealed by an end cap or electrolyte.

Although the present invention has been described with reference to a solid oxide fuel cell arranged on the dense non-porous tube and the dense non-porous tube having an aperture to supply fuel to the second member, it may be equally possible for the solid oxide fuel cell to be arranged on the dense non-porous tube and the dense non-porous tube having an aperture to supply fuel to the first member.

It may be possible to provide an arrangement of the fuel cell in which the conduit in the fuel cell is supplied with fuel and oxidant is supplied around the fuel cell.

Although the present invention has been described with reference to a solid oxide fuel cell arranged on a dense non-porous plate and the dense non-porous plate has an aperture to supply oxidant to the second member, it may be equally possible for a solid oxide fuel cell to be arranged on a dense non-porous plate and the dense non-porous plate has an aperture to supply fuel to the first member.

Although the present invention has been described with reference to solid oxide fuel cells, it may equally well be applicable to other ceramic fuel cells, or other types of fuel cells or solid oxide electrolysis cells.

An advantage of the present invention is that it allows a much reduced scale for the sub unit and a much reduced fuel cell pitch without waste.

The reduced fuel cell pitch together with locally parallel current collectors enables potential use of much higher resistivity current collector materials. Also permits the use of materials only considered suitable as electrode materials to be used for lateral current collectors either as separate layers of the electrodes or within the electrodes.

The present invention provides a multiple layer ceramic fuel cell, e.g. a multiple layer solid oxide fuel cell.

Although the present invention has been described with a single aperture to supply oxidant, or fuel, to each solid oxide fuel cell, it may be possible to provide more than one aperture to supply oxidant, or fuel, to each solid oxide fuel cell. The use of more than one aperture may be necessary if the solid oxide fuel cells are large. However, coefficient of thermal expansion matching and conductive cooling will limit the size of the solid oxide fuel cells. For example the solid oxide fuel cells will have dimensions of up to 30 mm length, 30 mm width and 30 mm height.

The solid oxide fuel cell is manufactured, as shown in FIG. 9, by forming a plurality of thin sheets/plates of dense non-porous electrolyte material 100 by tape casting, or dry rolling, a powder preparation of the electrolyte material, such as yttria stabilised zirconia in a binder. Each sheet/plate of the electrolyte material is dried in the case of tape casting. The binder is removed from the electrolyte material and the electrolyte material is sintered at a high temperature, for example 1000° C. to 1600° C., to form a thin continuous dense non porous sheet/plate of dense non-porous electrolyte of thickness 3 μm to 300 μm.

A plurality of apertures 102 are formed through each dense non-porous sheet/plate of electrolyte 100. The apertures 102 in each sheet/plate of electrolyte material 100 are preferably formed in a rectangular pattern. The apertures may be square, rectangular, hexagonal, circular or other suitable shape in cross-section.

The anode electrode material 104 is deposited onto one surface 108 of each sheet/plate of electrolyte material 100 and the cathode electrode material 106 is deposited onto the oppositely facing surface 110 of the respective sheet/plate of electrolyte material 100 using screen printing or stencil printing or other suitable method. The left hand side of the top sheet/plate of electrolyte material 100 shows the anode electrode material 104 on the surface 108 and the right hand side of the top sheet of electrolyte material 100 shows the cathode electrode material 106 on the surface 110. Usually one of the electrode materials is a precursor material so that both electrode materials may be processed in a single furnace environment.

For example the anode electrode material is deposited in an oxidising atmosphere compatible precursor form such as NiO—YSZ in the case of forming Ni—YSZ anode electrodes. The anode electrode material may be processed in the same oxidising furnace environment as the cathode electrode material, such as LSM.

Alternatively, it is possible to use a cathode material precursor capable of withstanding firing in a reducing atmosphere.

It may be possible to use an anode material capable of withstanding reducing and oxidising environments and in this case all processing may be performed without the need for precursor materials.

The electrodes may be enhanced by additional over printing or infiltration of current collector material, such as binary or ternary alloys platinum, palladium, nickel, silver, gold or copper to form a current collector layer. Each current collector layer may be printed and dried, have the binder removed and then sintered or the current collector layer may be co-sintered with the other layers.

The electrodes are deposited in a predetermined pattern on each sheet/plate of electrolyte material, with the anode electrodes deposited on one surface of each sheet/plate of electrolyte material and the cathode electrodes deposited on the opposite surface of each sheet/plate of electrolyte material. The anode electrode material 104 is deposited around each of the apertures 102, e.g. centred on each aperture 102, and extends a predetermined distance from each aperture 102, and thus the anode electrode material is deposited at discrete separated positions on the surface 108. For example the anode electrode material 104 may be deposited in a rectangle or a square around a rectangular, or square, cross-section aperture 102. The cathode electrode material 106 is deposited such that it is spaced a predetermined distance from each of the apertures 102, but otherwise covers the whole of that surface 110 of the sheet/plate of electrolyte material 100. For example the cathode electrode material 106 may be deposited as a sheet with rectangular, or square, shaped apertures with larger dimensions than rectangular, or square, shaped apertures 102 in the sheet of electrolyte material 100.

A plurality of the sheets of the electrolyte material 100 are arranged in a stack 120 such that the apertures 102 in all of the sheets of electrolyte material 100 are aligned. The sheets of electrolyte material are arranged such that the anode electrodes of one sheet of electrolyte material faces the cathode electrodes of an adjacent sheet of electrolyte material. Thus, it may be possible to stack up to 400 sheets of electrolyte material, for example 2 to 50 sheets of electrolyte material, on top of each other.

In addition sheets of non-ionically conducting material 112, for example non-ionically conducting zirconia, are produced. A plurality of apertures 114 are formed through each sheet of non-ionically conducting material 112. The apertures 114 in each sheet/plate of non-ionically conducting material 112 are preferably formed in the same pattern and with the same dimensions as in the sheets of electrolyte material 100, in a rectangular pattern. The apertures may be square, rectangular, hexagonal, circular or other suitable shape in cross-section. An additional set of apertures 116 is formed in the non-ionically conducting material 112 and each of these apertures 116 is filled with an electrically conducting interconnector 118. The additional apertures 116 are arranged around each one of the apertures 114.

The sheets of non-ionically conducting material 112 are also arranged in the stack such that each sheet of non-ionically conducting material 112 is positioned between two adjacent sheets of electrolyte material 100 and such that the apertures 114 in the non-ionically conducting material 112 are aligned with the apertures 102 in the sheets of electrolyte material 100.

During the stacking procedure electrolyte material is placed between the sheets of electrolyte material and the sheets of non-ionically conducting material to fill the spaces at the edges of the anode electrodes and to fill the spaces at the edges of the cathode electrodes and the apertures. For example layers of picture frames of electrolyte material are placed between the adjacent sheets of electrolyte material to fill the space between the edges of the adjacent anode electrodes and to fill the spaces between the cathode electrodes and the apertures.

A continuous layer of electrolyte material, or a compatible expansion matched insert material, is typically included as the uppermost layer of the stack so that the apertures, for supplying reactant to the sets of anode electrodes are closed and is separated from the cathode edges.

A similar holed layer of gas tight material is typically included at the bottom of the stack to ensure gas cannot escape at the edges of the lowest porous electrode layer. The layer of gas tight material may be one of the rectangular picture frames of electrolyte material, or where the substrate material or sealing gas is incompatible with the electrolyte material the layer of gas tight material may be a relatively inert expansion compatible barrier material such as stabilised zirconia material or magnesia magnesium aluminate (MMA).

If the sheets of electrolyte material with electrodes in the stack have already been fired, it may be necessary to coat the sheets of electrolyte material with un-sintered material, or a sinter aid, so that the sheets of electrolyte material actively sinter together on firing. However, if suitable binder systems are used it is beneficial to co-sinter the entire stack of electrolyte sheets only once.

The stack of sheets of electrolyte material and non-ionically conducting material is then divided into a plurality of green solid oxide fuel cells by cutting through the stack 120 in two perpendicular directions, in the case of rectangular, or square, solid oxide fuel cells. Thus the stack is cut in a first set of parallel planes X, with each plane X positioned mid way between the apertures 102 in the sheets of electrolyte material 100, and is cut in a second set of parallel planes Y, with each plane Y positioned mid way between the apertures 102 in the sheets of electrolyte material 100, and with the first set of planes X perpendicular to the second set of planes Y. These planes X and Y are arranged substantially perpendicular to the plane of the sheets of electrolyte material 100 and the sheets of non-ionically conducting 112.

The green solid oxide fuel cells are then pressed if necessary and then fired at high temperature, for example 700° C. to 1500° C., so that the sheets of electrolyte material fuse to form gas tight seals around the electrodes and in particular the picture frames of electrolyte material fuse to the sheets of electrolyte material in the multilayer solid oxide fuel cells. However, it may be possible to dispense with the picture frames of electrolyte material if the number of sheets of electrolyte material is low to allow deformation of the sheets of electrolyte material to form the gas tight seals around the electrodes. In addition the electrically conducting interconnectors 118 are bonded to the adjacent anode electrode material 104 and cathode material 106.

The completed solid oxide fuel cells are then attached, and sealed, to a dense non-porous member, e.g. a substrate, such that the aperture in each solid oxide fuel cell is arranged with a corresponding aperture in the dense non-porous member. The solid oxide fuel cells are attached and sealed to the dense non-porous member using a suitable sealing material, for example a glass ceramic, to form a gas tight seal between the bottom of the solid oxide fuel cell and the dense non-porous member.

Electrical connections are made to the cathode material on the outer surfaces of the solid oxide fuel cells and to the anode material on the surfaces of the apertures of the solid oxide fuel cells, using wire, tape or thick film layers using known techniques.

Once a complete gas tight assembly has been produced, it may be necessary to heat to a high temperature, for example 300° C. to 900° C., and to supply the anode electrodes with a reducing mixture of hydrogen in nitrogen or other suitable mixture to reduce the anode electrodes. Alternatively if the cathode material has been formed as a precursor, so that the assembly may be processed in a reducing atmosphere, the cathode electrodes are supplied with an oxidising mixture to oxidise the cathode electrodes.

In an alternative method of manufacturing the solid oxide fuel cells in which the oxidant is supplied to the apertures and the cathode electrodes are supplied with oxidant from the apertures, the cathode electrode material is deposited around each of the apertures, e.g. centred around each aperture, and extends a predetermined distance from each aperture, and thus the cathode electrode material is deposited at discrete separated positions. For example the cathode electrode material may be deposited in a rectangle, or square around a rectangular, or square, cross-section aperture. The anode electrode material is deposited such that it is spaced a predetermined distance from each of the apertures, but otherwise covers the whole of that surface of the sheet/plate of electrolyte material. For example the anode electrode material may be deposited as a sheet with rectangular, or square, shaped apertures with larger dimensions than rectangular, or square, shaped apertures in the sheet of electrolyte material.

A continuous layer of electrolyte material, or a compatible expansion matched insert material, is typically included as the uppermost layer of the stack so that the apertures, for supplying reactant to the sets of cathode electrodes are closed and is separated from the anode edges.

In an alternative method of manufacturing the solid oxide fuel cells, the stack of sheets of electrolyte material and the sheets of non-ionically conducting material is heated to a high temperature, for example 300° C. to 900° C., and the anode electrodes are supplied with a reducing mixture of hydrogen in nitrogen or other suitable mixture to reduce the anode electrodes. Alternatively if the cathode material has been formed as a precursor, so that the assembly may be processed in a reducing atmosphere, the cathode electrodes are supplied with an oxidising mixture to oxidise the cathode electrodes.

Then the stack of sheets of electrolyte material and sheets of non-ionically conducting material is divided into a plurality of green solid oxide fuel cells by cutting through the stack in two perpendicular directions, in the case of rectangular, or square, solid oxide fuel cells. Thus the stack is cut in a first set of parallel planes, with each plane positioned mid way between the apertures in the sheets of electrolyte material, and is cut in a second set of parallel planes, with each plane positioned mid way between the apertures in the sheets of electrolyte material, and with the first set of planes perpendicular to the second set of planes. These planes are arranged substantially perpendicular to the plane of the sheets of electrolyte material and the sheets of non-ionically conducting material.

In a further alternative method of manufacturing the solid oxide fuel cells it is possible to form one or more sheets of electrolyte material, form the apertures in the sheets of electrolyte material, deposit the anode electrode material and the electrode material on the surfaces of the sheets, cut the sheets in two perpendicular directions to form pieces with an aperture through each piece. One or more sheets of non-ionically conducting material are formed and apertures are formed in the sheets of non-ionically conducting material in the same pattern as in the sheets of electrolyte material. A further set of apertures is formed around each of the apertures in each of the sheets of non-ionically conducting material and these apertures are filled with an electrically conducting interconnector. Each of the sheets of non-ionically conducting material is cut in two perpendicular directions to form pieces with an aperture through each piece. The pieces of electrolyte material and the pieces of non-ionically conducting material are stacked alternately on top of each other so that the apertures are aligned to form a green solid oxide fuel cell. These planes are arranged substantially perpendicular to the plane of the sheets of electrolyte material. Then green solid oxide fuel cells are heated to 300° C. to 900° C., and the anode electrodes are supplied with a reducing mixture of hydrogen in nitrogen or other suitable mixture to reduce the anode electrodes. Alternatively if the cathode material has been formed as a precursor, so that the assembly may be processed in a reducing atmosphere, the cathode electrodes are supplied with an oxidising mixture to oxidise the cathode electrodes.

In all of the above mentioned methods it may be possible to deposit the anode electrode material and the cathode electrode material onto the surfaces of the sheets of electrolyte material in the predetermined patterns and then to form the apertures through the sheets of electrolyte material, either through the anode electrode material if the apertures supply fuel to the anode electrodes of the solid oxide fuel cells or through the cathode electrode material if the apertures supply oxidant to the cathode electrodes of the solid oxide fuel cells.

Although the sheets of electrolyte material have been cut into squares or rectangles, centred on the apertures through the sheets of electrolyte material it is equally possible to cut them into other suitable shapes for example triangles, hexagons, octagons etc centred on the apertures through the sheets of electrolyte material.

The invention claimed is:

1. A fuel cell assembly comprising a porous anode electrode, a dense non-porous electrolyte and a porous cathode electrode, the anode electrode including a plurality of parallel plate members, the cathode electrode including a plurality of parallel plate members, the parallel plate members of the cathode electrode inter-digitating with the parallel plate members of the anode electrode, the electrolyte including at least one electrolyte member filling at least one space between the parallel plate members of the anode electrode and the parallel plate members of the cathode electrode, at least one non-ionically conducting member filling at least one space between the parallel plate members of the anode electrode and the parallel plate members of the cathode electrode, the at least one electrolyte member and the at least one non-ionically conducting member being arranged alternately and the at least one non-ionically conducting member having at least one interconnector to electrically interconnect at least one parallel plate member of the anode electrode and at least one parallel plate member of the cathode electrode, each interconnector extending through an aperture provided in the at least one non-ionically conducting member, wherein the parallel plate members of the anode electrode, the parallel plate members of the cathode electrode, the at least one electrolyte member and the at least one non-ionically conducting member are provided with aligned apertures, which define a conduit for a flow of fuel or oxidant and a first end of the conduit is sealed by an end cap or electrolyte.

2. A fuel cell assembly as claimed in claim 1 wherein the plate members of the anode electrode are substantially circular, rectangular, square or hexagonal in shape.

3. A fuel cell assembly as claimed in claim 1 wherein the plate members of the cathode electrode are substantially circular, rectangular, square or hexagonal in shape.

4. A fuel cell assembly as claimed in claim 1, wherein the fuel cell is arranged on a dense non-porous member and the dense non-porous member has an aperture to supply oxidant to the conduit.

5. A fuel cell assembly as claimed in claim 4 wherein the fuel cell is arranged on a dense non-porous tube and the dense non-porous tube has an aperture to supply oxidant to the conduit.

6. A fuel cell assembly as claimed in claim 4 wherein the fuel cell is arranged on a dense non-porous plate and the dense non-porous plate has an aperture to supply oxidant to the conduit.

7. A fuel cell assembly as claimed in claim 1 wherein the fuel cell is a solid oxide fuel cell.

8. A fuel cell assembly as claimed in claim 7 wherein the electrolyte comprises zirconia or yttria stabilised zirconia.

9. A fuel cell stack including a plurality of the fuel cells as claimed in claim 1.

10. A fuel cell stack as claimed in claim 9 wherein the fuel cells are electrically connected in series.

11. A fuel cell stack as claimed in claim 10 wherein the fuel cell stack includes a first dense non-porous plate and a second dense non-porous plate, the first and second dense non-porous plates each having a plurality of apertures to supply oxidant to a conduit of a respective one of a plurality of fuel cells, the conduit is arranged to supply oxidant to the parallel plate members of the cathode electrode of the respective one of the plurality of fuel cells, and the first and second dense non-porous plates are arranged with the fuel cells therebetween to form a passage for supply of a fuel to the parallel plate members of the anode electrodes of the fuel cells.

12. A fuel cell stack as claimed in claim 11 wherein the fuel cells on the first and second dense non-porous plates are arranged in predetermined patterns.

13. A fuel cell stack as claimed in claim 12 wherein the fuel cells on the first dense non-porous plate are arranged alternately with fuel cells on the second dense non-porous plate.

14. A method of manufacturing a fuel cell comprising forming a plurality of sheets of electrolyte material, depositing anode electrode material on a first surface of each sheet of electrolyte material, depositing cathode material on a second surface of each sheet of electrolyte material, forming a plurality of apertures through each sheet of electrolyte material, forming a plurality of sheets of non-ionically conducting material, forming a plurality of apertures through each sheet of non-ionically conducting material, arranging the sheets of electrolyte material in a stack such that the anode electrode material of one sheet of electrolyte material faces the cathode electrode material of an adjacent sheet of electrolyte material, forming an additional set of apertures through each sheet of non-ionically conducting material, filling each of the apertures of the additional set of apertures in each sheet of non-ionically conducting material with an electrically conducting material interconnector, and arranging the sheets of non-ionically conducting material in the stack such that each sheet of non-ionically conducting material is positioned directly between two adjacent sheets of electrolyte material and such that the apertures in the sheets of non-ionically conducting material are aligned with the apertures in the sheets of electrolyte material, dividing the stack into a plurality of pieces such that an aperture extends into each piece to form a fuel cell.

15. A method of manufacturing a fuel cell comprising forming at least one sheet of electrolyte material, depositing anode electrode material on a first surface of each sheet of electrolyte material and depositing cathode material on a second surface of each sheet of electrolyte material, forming a plurality of apertures through each sheet of electrolyte material, dividing the at least one sheet of electrolyte material into a plurality of pieces such that an aperture extends through each piece, forming at least one sheet of non-ionically conducting material, forming a plurality of apertures through each sheet of non-ionically conducting material, forming an additional set of apertures through each sheet of non-ionically conducting material, filling each of the apertures of the additional set of apertures in each sheet of non-ionically conducting material with an electrically conducting material interconnector, dividing the at least one sheet of non-ionically conducting material into a plurality of pieces such that an aperture extends through each piece, arranging the pieces of electrolyte material in a stack such that the anode electrode material of one piece of electrolyte material faces the cathode electrode material of an adjacent piece of electrolyte material and the apertures in the pieces of electrolyte material are aligned, arranging the pieces of non-ionically conducting material in the stack such that each piece of non-ionically conducting material is positioned directly between two adjacent pieces of electrolyte material and such that the apertures in the sheets of non-ionically conducting material are aligned with the apertures in the sheets of electrolyte material to form a fuel cell.

16. A method of manufacturing a fuel cell comprising forming a plurality of sheets of electrolyte material, forming a plurality of apertures through each sheet of electrolyte material, depositing anode electrode material on a first surface of each sheet of electrolyte material, depositing cathode material on a second surface of each sheet of electrolyte material, forming a plurality of sheets of non-ionically conducting material, forming a plurality of apertures through each sheet of non-ionically conducting material, forming an additional set of apertures through each sheet of non-ionically conducting material, filling each of the apertures of the additional set of apertures in each sheet of non-ionically conducting material with an electrically conducting material interconnector, arranging the sheets of electrolyte material in a stack such that the anode electrode material of one sheet of electrolyte material faces the cathode electrode material of an adjacent sheet of electrolyte material and arranging the sheets of non-ionically conducting material in the stack such that each sheet of non-ionically conducting material is positioned directly between two adjacent sheets of electrolyte material and such that the apertures in the sheets of non-ionically conducting material are aligned with the apertures in the sheets of electrolyte material, dividing the stack into a plurality of pieces such that an aperture extends into each piece to form a fuel cell.

17. A method of manufacturing a fuel cell comprising forming at least one sheet of electrolyte material, forming a plurality of apertures through each sheet of electrolyte material, depositing anode electrode material on a first surface of each sheet of electrolyte material, depositing cathode material on a second surface of each sheet of electrolyte material, dividing the at least one sheet of electrolyte material into a plurality of pieces such that an aperture extends through each piece, forming at least one sheet of non-ionically conducting material, forming a plurality of apertures through each sheet of non-ionically conducting material, forming an additional set of apertures through each sheet of non-ionically conducting material, filling each of the apertures of the additional set of apertures in each sheet of non-ionically conducting material with an electrically conducting material interconnector, dividing the at least one sheet of non-ionically conducting material into a plurality of pieces such that an aperture extends through each piece, arranging the pieces of electrolyte material in a stack such that the anode electrode material of one piece of electrolyte material faces the cathode electrode material of an adjacent piece of electrolyte material and the apertures in the pieces of electrolyte material are aligned, arranging the pieces of non-ionically conducting material in the stack such that each piece of non-ionically conducting material is positioned directly between two adjacent pieces of electrolyte material and such that the apertures in the sheets of non-ionically conducting material are aligned with the apertures in the sheets of electrolyte material to form a fuel cell.

* * * * *